United States Patent [19]
Wonn et al.

[11] 3,852,955
[45] Dec. 10, 1974

[54] TORQUE LIMITING CONVERTER STATOR
[75] Inventors: Quinby E. Wonn, Plymouth; William J. Vukovich, Ann Arbor, both of Mich.
[73] Assignee: General Motors Corporation, Detroit, Mich.
[22] Filed: Feb. 8, 1974
[21] Appl. No.: 440,784

[52] U.S. Cl.................... 60/354, 60/356, 60/364, 60/367
[51] Int. Cl............................................ F16h 41/12
[58] Field of Search............ 60/341, 342, 354, 362, 60/364, 367, 356

[56] References Cited
UNITED STATES PATENTS
2,909,034  10/1959  Jandasek............................ 60/342
3,398,532  8/1968  Egbert et al........................ 60/354
3,425,220  2/1969  Egbert et al........................ 60/354

Primary Examiner—Edgar W. Geoghegan
Attorney, Agent, or Firm—Donald F. Scherer

[57] ABSTRACT

A variable capacity torque converter in which the reactor vanes are pivoted in response to the torque absorption capacity of the impeller to limit the torque output of the turbine. The torque ratio, output torque divided by input torque, of the converter is reduced by controlling the angle of the reactor vanes such that, when the torque capacity of the impeller is at a high value, the torque ratio is lowered to limit the maximum torque that can be delivered by the turbine. The reactor vanes are pivotally mounted on an axially movable member such that fluid flow forces, proportional to impeller capacity, acting on the reactor vanes cause the vanes and the movable member to move axially resulting in pivoting of the vanes to change the torque ratio of the torque converter.

5 Claims, 5 Drawing Figures

TORQUE LIMITING CONVERTER STATOR

This invention relates to torque converters and more particularly to variable capacity torque converters.

The torque input to planetary type transmissions is quite often limited by the torque transmitting capacity of the clutches or by the torque capacity of the brakes in the transmission. Many of the prior art planetary type transmissions utilize a torque converter to provide a fluid drive between the engine output shaft and the transmission input shaft. The torque transmitting capabilities of the torque converter are designed so that the maximum torque transmitted does not exceed the torque capacity which can be effectively transmitted through the planetary gearing. As is well known, the maximum torque transmission in a torque converter occurs at a stall point. Thus, the maximum size of the converter is limited by the stall condition.

In many instances, it is desirable to provide a higher capacity torque converter so that better performance and economy can be achieved at intermediate speed ratios in the torque converter. In the past, variable capacity torque converters have been used to provide this function. The most common type of variable capacity torque converter is the type using a variable pitch stator blade such as that shown in U.S. Pat. No. 3,346,082. These types of torque converters utilize a movable piston to position the stator blades at various angles. The position of the piston is controlled by a pressure source which is proportional to the vehicle performance parameter. These torque converters utilize sophisticated and sensitive controls.

The present invention provides a variable capacity torque converter having a stator including a plurality of blades which are pivotal to selective angles. The pivoting of the blades is responsive to the torque capacity of the impeller of the torque converter. The stator blades are pivotally mounted on an axially movable member through a crank, which has one end positioned in a relatively stationary member. The movable member and the vanes are both moved axially in response to fluid flow forces in the torque converter to change the blade angle, through the action of the crank, thereby reducing the torque ration of the converter. The flow forces are proportional to the torque absorption capacity of the impeller in a manner such that increasing flow forces are obtained with increasing absorption capacity. However, after the torque absorbing capacity of the impeller increases, the torque multiplying factor of the torque converter decreases, due to the change in blade angle, so that the torque output of the converter remains substantially constant. Since the maximum output torque of the converter can thus be controlled, the torque capacity of the clutches and brakes in the planetary gearing can be established, and the maximum torque can be produced through a wider range of speed ratios in the converter.

It is an object of this invention to provide an improved torque converter having a variable capacity in which the vanes of the reactor member are pivoted to reduce the torque ratio of the converter in response to the torque capacity of the impeller.

It is another object of this invention to provide an improved variable capacity torque converter having a reactor member with an axially movable hub pivotally supporting the reactor vanes which hub and vanes are moved in response to the absorption capacity of the impeller to pivot the vanes thereby reducing the torque ratio of the converter.

These and other objects and advantages of the present invention will be more apparent from the following description and drawings in which.

Figure 1:
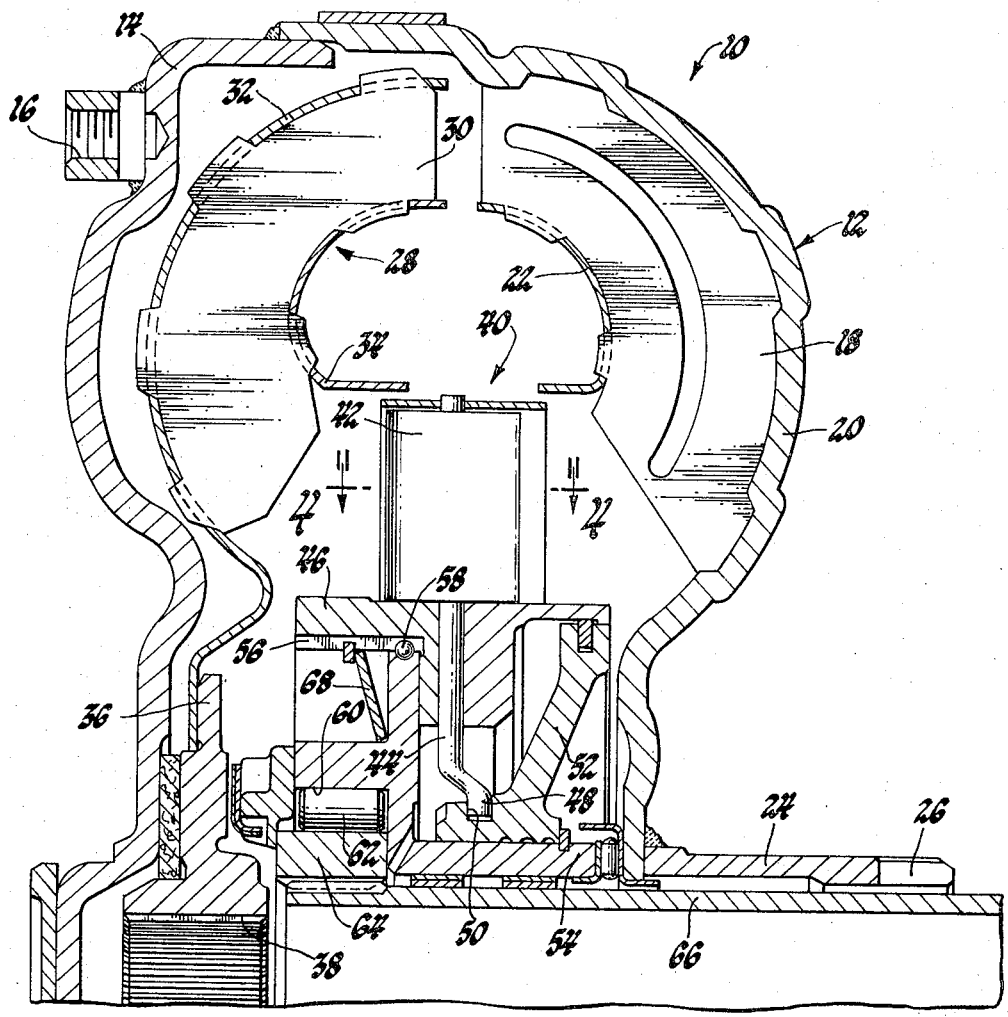
FIG. 1 is an elevational cross sectional view of a torque converter embodying the present invention.

Referring to the drawings, there is shown in FIG. 1 a torque converter, generally designated 10, having an impeller 12 which is welded or otherwise secured to an input member 14. The input member 14 has a plurality of threaded members 16 secured thereto which members 16 are adapted to be secured to a drive plate on the engine, not shown. The impeller 12 has a plurality of vane members such as 18 which are secured to an outer shell 20 and an inner core 22. The space provided between the outer shell 20, inner hub 22 and vanes 18 provide the flow paths for fluid flow through the impeller. The outer shell 20 is secured to a drive hub 24 which has a drive slot 26 adapted to drive a conventional internal-external gear pump, not shown.

The torque converter 10 also has a turbine member 28 adapted to receive fluid from the impeller 12 and convert the fluid forces to mechanical power to be delivered to a transmission input shaft, not shown. The turbine 28 includes a plurality of vanes 30 which are secured to an outer shell 32 and an inner core 34. The spaces provided by the vanes 30, the outer shell 32, and the inner core 34 provide fluid flow paths for the fluid delivered by the impeller 12. The outer shell 32 is secured to a hub 36 which has a splined portion 38 adapted to be drivingly connected to the transmission input shaft, not shown.

The fluid flowing through the turbine 28 is redirected to the impeller 12 by a stator or reactor member 40. The reactor member 40 includes a plurality of vanes 42 which are secured to a crank 44, which cranks 44 are rotatably supported in a hub 46. The end 48 of the cranks 44 are positioned in a groove 50 formed in a piston 52 which is slidably disposed in hub 46 and a member 54. The member 54 and the hub 46 are drivingly connected through splines 56 on the hub 46 and balls 58 positioned in the member 54. The splines 56 and balls 58 cooperate to provide a ball spline which permits free relative axial movement between the hub 46 and member 54. The member 54 includes an annular portion 60 which forms the outer race for a one way drive establishing device. The one way drive establishing device also has a plurality of rollers 62 and an inner race 64, which inner race 64 is splined to a stationary stator shaft 66. The one way device is designed such that counterclockwise rotation, when viewed from the input side of the torque converter, is prevented. Thus, the hub 46 and vanes 42 of the stator 40 cannot rotate in a counterclockwise direction.

As is well known with torque converters, the fluid delivered from the turbine 28 is redirected by the reactor vanes 42 to the input of the impeller 12. It is this redirection of the fluid which permits the torque multiplication in a torque converter and distinguishes a torque converter from a fluid coupling. It is also well known in torque converters that as the speed of the turbine increases, the direction of the fluid leaving the turbine vanes 30 changes until the fluid impinges on the back side of the reactor vanes 42, at which time, the reactor is driven in the same direction as the impeller and turbine and there is no torque multiplication within the torque converter.

The torque ratio of the torque converter is proportional to the angular position of the stator blades and the speed ratio between the impeller and the turbine. When the torque converter is at stall and the stator blades are at a low angle, as shown by the solid lines in FIG. 4, the torque ratio of the torque converter is at a maximum. If the turbine is maintained in a stalled position, and the stator blades are rotated toward the dashed position shown in FIG. 4, the torque ratio of the torque converter will decrease. Assuming no other changes in the system, for example input speed remains constant, the output torque will decrease as the blade angle moves from a low angle to a high angle. If the input speed should increase, the absorbing capacity of the impeller 12 will increase such that the torque output of the converter will increase. If, however, when the torque absorbing capacity of the impeller increases, the blades 42 are permitted to rotate from the low angle to the high angle, the output torque of the torque converter can be maintained substantially constant since the torque ratio is decreasing as the torque capacity is increasing. To permit the vanes 42 to pivot, a belleville spring 68 is positioned between the hub 46 and the member 54. The fluid forces acting on the vanes 42 are proportional to the torque absorbing capacity of the impeller 12 and have a force component in a direction which is axial to the torque converter. As this force increase above a predetermined value, the vanes 42 and the hub 46 will move in an axial direction toward the impeller against the force in spring 68. When the hub 46 is moved in an axial direction, the cranks 44 are forced to rotate since the one end 48 is positioned in the groove 50. Since the cranks 44 are secured to the vanes 42, the vanes 42 are pivoted from the solid position shown in FIG. 4 to the dashed position. As the vanes 42 move toward the dashed position, the torque ratio of the torque converter decreases.

The piston 52 is positioned by the charge pressure of the fluid coming into the torque converter. As the charge pressure increases, the piston 52 is moved to the left in FIG. 1 to cause the vanes 42 to pivot thereby reducing the torque ratio of the converter. This is desirable since the absorption capacity of the impeller is proportional to charge pressure. When the torque converter is used with a control system having a constant charge pressure, the piston 52 may be eliminated. When the piston 52 is not used, the stator 40 may be constructed in accordance with the stator 70 shown in FIG. 2 or the stator 72 shown in FIG. 3.

Figure 2:
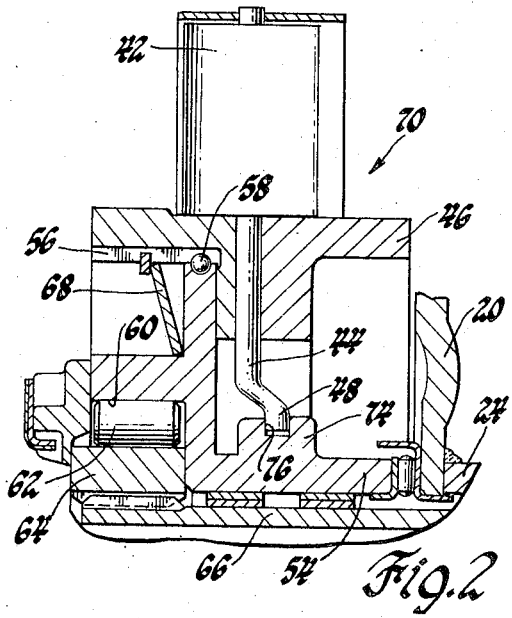
FIG. 2 is a cross sectional view of another embodiment of the torque converter reactor member.

The stator components shown in FIG. 2 have the same numerical designation as the corresponding components shown in FIG. 1. In FIG. 2, the vanes 42 are secured to a crank 44 which crank 44 is rotatably mounted in the drum 46. The drum 46 is drivingly connected to the member 54 through a spline 56 and a ball 58. The member 54 has a radially extending ring portion 74 in which is formed a groove 76. The end of the cranks 44 is mounted in the groove 76. The member 54 is drivingly connected to the stator shaft 66 through a one way device comprised of an outer race 60, an inner race 64, and a plurality of rollers 62 in a manner similar to that described above for FIG. 1. The drum 46 and vanes 42 are movable in an axial direction in FIG. 2 in response to the fluid flow forces acting on the vanes 42 in a manner similar to that described in FIG. 1 such that with increasing torque absorbing capacity of the impeller 10, the vanes 42 are pivoted when the flow forces overcome the force in spring 68 to reduce the torque ratio of the torque converter.

Figure 3:
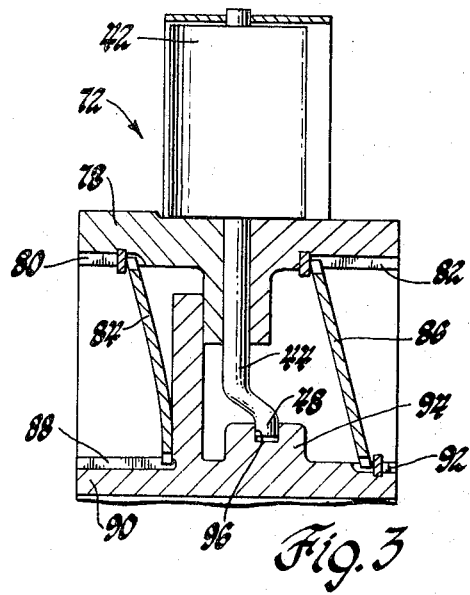
FIG. 3 is a sectional view of a further embodiment of the reactor member.

The stator 72 shown in FIG. 3 includes a plurality of vanes 42 which are secured to cranks 44 which cranks 44 are rotatably mounted in a drum 78. The drum 78 has two splined portions 80 and 82 which are drivingly connected to a pair of belleville springs 84 and 86 respectively. The belleville spring 84 is drivingly connected to a spline 88 formed on an inner sleeve shaft 90 which shaft 90 is connected to a stationary member in the transmission through a one way device, not shown. Sleeve shaft 90 has a second splined portion 92 to which is drivingly connected the spring 86. The sleeve shaft 90 also has a radially extending ring portion 94 in which is formed a groove 96 which is adapted to contain the end 48 of cranks 44. Rotational driving forces imposed on the vanes 42 are transmitted through a drum 78 by the springs 84 and 86 to the sleeve shaft 90. As discussed above for FIG. 1, the one way device prevents counterclockwise rotation of the drum 78 and vanes 42 while permitting clockwise rotation thereof. The springs 84 and 86 permit relative axial movement between the drum 78 and sleeve shaft 90 while maintaining a rotaional drive relation. Axial movement of the drum 78 is caused by the flow forces in the converter acting on the vanes 42 such that when the flow forces overcome the forces in springs 84 and 86, the drum 78 and vanes 42 will move to the right resulting in pivoting of the vanes 42 which causes a reduction in the torque ratio in the torque converter.

Figures 4, 5:
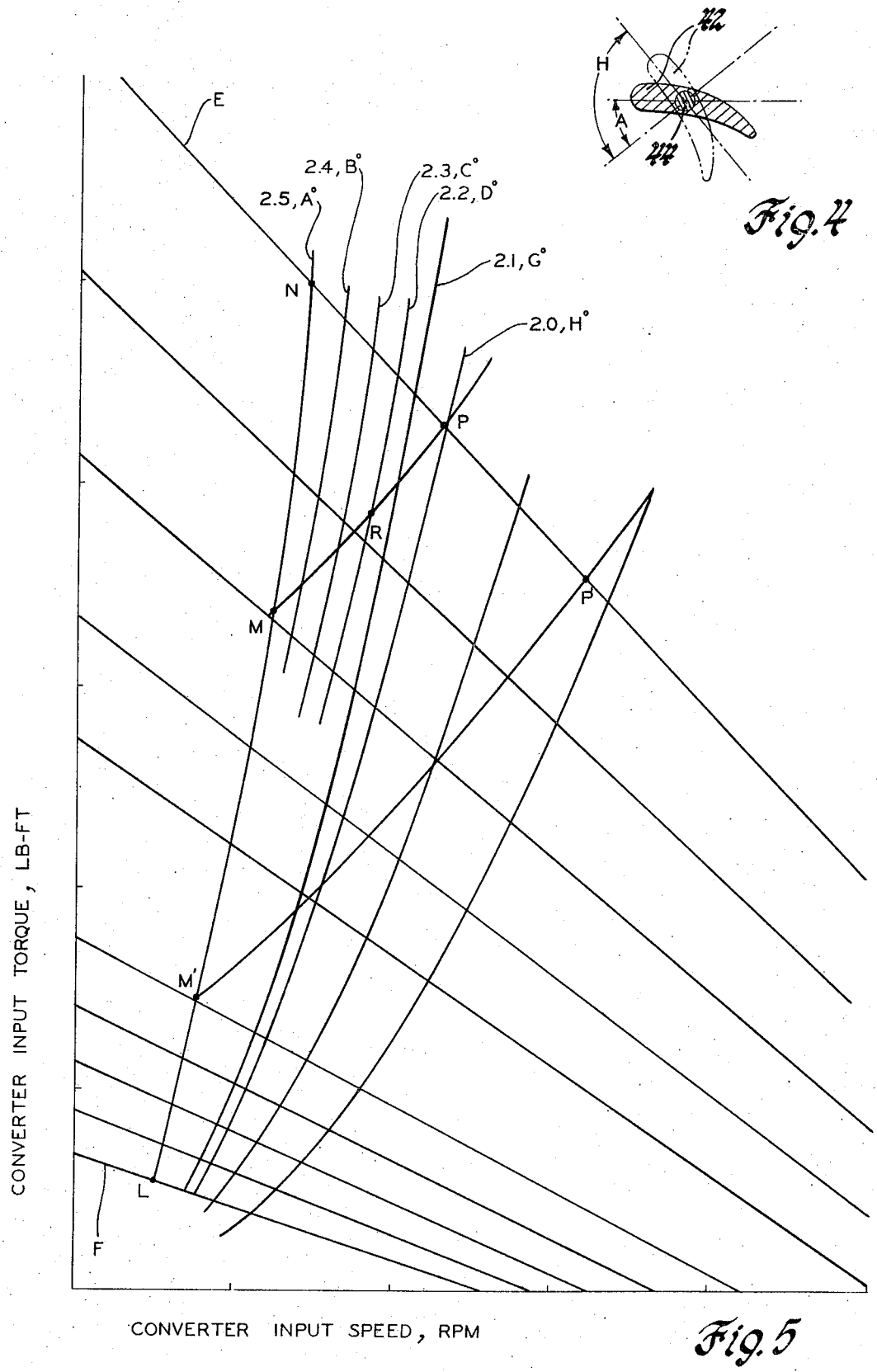
FIG. 4 is a sectional view taken along line 4—4 of FIG. 1 showing the reactor vanes in the extreme angles.
FIG. 5 is a graph of the converter input torque versus converter input speed when the present invention is utilized.

The graph shown in FIG. 5 depicts the performance of a torque converter utilizing the variable position stators described above in FIGS. 1, 2, or 3. For the purpose of the following discussion of the performance curves shown in FIG. 5, the maximum torque ratio of the converter is assumed to be 2.5 when the stator blade 42 is at angle A. The curves shown in FIG. 5 extending from the lower left corner upwardly are curves representing the different stall torque ratios in the converter. The curves extending generally downwardly from left to right are curves depicting engine performance for a gas turbine type engine. The upper curve E represents 100 percent gasifier speed in the turbine engine and the lower curve F represents 50 percent gasifier speed. The curves intermediate E and F represent various gasifier speeds between 50 and 100 percent.

Assuming the maximum input torque which can be transmitted by the planetary gearing friction devices is 840 pound feet, the following is a description of the operation of the torque converter: With the turbine engine at idle and a gasifier speed of 50 percent, the torque converter will be at a 2.5 torque ratio, at point L on the graph. As the operator increases the throttle setting, the gasifier speed will increase to a point M at which time the input torque will be 336 pound feet and the output torque will be 840 pound feet. A further increase in throttle setting will result in higher input torques to the converter which would normally result in output torques greater than the desired amount. As a result of the increased torque capacity of the impeller 12 the flow forces acting on vanes 42 will result in pivoting of the vanes 42 to reduce the torque ratio. Assuming the operator applied sufficient throttle to accomplish 100 percent gasifier speed represented by curve E, the vanes 42 would pivot to reduce the torque ratio until a new equalibrium point occurs in the torque converter. This point is represented by point P which for this example is the intersection of curve E and a curve representing a 2.0 torque ratio in the torque converter when the stator blades are at angle H. The curve M-P repesents various equilibrum points for the stator blades between 2.5 torque ratio and a 2.0 torque ratio. For example, the point R for an equilibrium point when the torque ratio is 2.2 and the stator blades 42 are at angle D.

As the turbine 28 begins to rotate, therefore the vehicle is moving, the torque ratio in the torque converter will decrease. This will be accompanied by a decrease in the flow forces acting on the stator 40. As the flow forces decrease, the stator blades 42 will move from angle H toward angle A, thereby maintaining the torque ratio at substantially 2.0. This torque ratio remains substantially constant with the different blade angles because when the speed ratio of a torque converter increases the torque ratio decreases if the stator angle blade is maintained at a constant value. Thus, by permitting the stator blade angle to return toward the higher torque ratio position, the torque ratios in the converter can be maintained. Another way of stating this proposition is that the curves representing the various torque ratios in FIG. 5 are stall performance characteristics. These curves also represent torque ratios for a fixed angle stator at various converter speed ratios. For example, point M represents the peformance characteristic of a torque converter stator for a blade angle A and a 2.5 torque ratio at stall, point R represents the same stator blade angle at an intermediate speed ratio wherein the torque ratio of the converter will be reduced to 2.2, and point P represents the same converter having the same stator angle operating at a higher speed ratio with a resulting reduction in torque ratio to 2.0.

The area bounded by points M, P and N is not used by the torque converter of the above example since to do so would result in higher than desirable input torque to the planetary transmission. The curve M, P is determined by the spring 68 or springs 84 and 86 and can therefore be moved with respect to the engine curves by changing the spring characteristics for example if a lower maximum torque converter output torque is desired, the preload of the springs can be changed such that the stator angle will begin changing at point M' and will continue to change until the point P' is reached. The curve M' P' represents a torque converter having a substantially constant output torque of approximately 400 pound feet.

Obviously, many modifications and variations of the present invention are possible in light of the above teachings. It is, therefore, to be understood that within the scope of the appended claims the invention may be practiced otherwise than as specifically described.

What is claimed is:

1. A fluid torque converter comprising, impeller means adapted to be driven by an engine for creating fluid flow in said torque converter; turbine means for delivering torque from said torque converter in response to fluid flow from said impeller; and reactor means for redirecting the fluid flow from said turbine to said impeller including a plurality of vane means angularly disposed in the flow path between said turbine and impeller, annular drum means, and a plurality of pivot means rotatably supported in said annular drum means having one portion secured to the vane means and another portion operatively connected to a relatively stationary member, said vane means and said annular drum means being movable axially relative to said impeller means in response to fluid flow forces on said vane means for changing the angular disposition of said vane means in said flow path for controlling the capacity of said torque converter to limit the maximum output torque of said torque converter.

2. A variable capacity torque converter comprising, impeller means adapted to be driven by a prime mover for delivering fluid flow; turbine means for delivering torque from said torque converter in response to fluid flow from said impeller means; and reactor means disposed between said turbine means and said impeller means for redirecting flow therebetween including vane means, an annular member disposed for axial movement between said turbine means and said impeller means in response to fluid flow forces on said vane means, pivotal means for mounting said vane means on said annular member and for pivoting said vane means in the flow path in response to axial movement of said annular member for limiting the capacity of said torque converter, and connecting means including one-way means for preventing rotation of said vanes and annular member in the direction opposite to the rotation of the impeller means and turbine means.

3. A fluid torque converter comprising, impeller means adapted to be driven by an engine for creating fluid flow in said torque converter; turbine means for delivering torque from said torque converter in response to fluid flow from said impeller; and reactor means for redirecting the fluid flow from said turbine to said impeller including a plurality of vane means angularly disposed in the flow path between said turbine and impeller, annular drum means, a plurality of pivot means rotatably supported in said annular drum means having one portion secured to the vane means and another portion operatively connected to a relatively stationary member, spring means for biasing said annular drum means in one direction to establish maximum torque ratio in said torque converter, said vane means and said annular drum means being movable axially relative to said impeller means against said spring means in response to fluid flow forces on said vane means for changing the angular disposition of said vane means in said flow path for reducing the torque ratio of said torque converter to limit the maximum output torque of said torque converter.

4. A fluid torque converter comprising, impeller means adapted to be driven by an engine for creating fluid flow in said torque converter; turbine means for delivering torque from said torque converter in response to fluid flow from said impeller; reactor means for redirecting the fluid flow from said turbine to said impeller including a plurality of vane means angularly disposed in the flow path between said turbine and impeller, angular drum means, piston means slidably disposed in said drum means and being positioned therein by inlet pressure to the impeller means, a plurality of pivot means rotatably supported in said annular drum means having one portion secured to the vane means and another portion operatively connected to said piston means, and spring means for biasing said drum means in one direction to establish the maximum torque ratio in the torque converter and said piston means being movable by the inlet pressure to reduce the maximum torque ratio without changing the spring bias, said vane means and said annular drum means being movable axially relative to said impeller means and said piston means against said spring means in response to fluid flow forces on said vane means for changing the angular disposition of said vane means in said flow path for reducing the torque ratio of said torque converter to limit the maximum output torque of said torque converter.

5. A variable capacity torque converter comprising, impeller means adapted to be driven by a prime mover for delivering fluid flow; turbine means for delivering torque from said torque converter in response to fluid flow from said impeller means; and reactor means disposed between said turbine means and said impeller means for redirecting flow therebetween including vane means, an annular member disposed for axial movement between said turbine means and said impeller means in response to fluid flow forces on said vane means, crank means for mounting said vane means on said annular member and for pivoting said vane means in the flow path in response to axial movement of said annular member for limiting the capacity of said torque converter, connecting means including one-way means for preventing rotation of said vanes and annular member in the direction opposite to the rotation of the impeller means and turbine means, and spring means for biasing said annular member against axial movement and for drive connecting said annular member and said connecting means.

* * * * *